United States Patent [19]
Sharpe

[11] Patent Number: 5,363,377
[45] Date of Patent: Nov. 8, 1994

[54] COMMUNICATIONS SYSTEM AND RECEIVER FOR USE THEREIN WHICH INDICATES TIME BASED ON A SELECTED TIME MESSAGE SIGNAL FROM A CENTRAL STATION

[75] Inventor: Anthony K. Sharpe, Cambridge, England

[73] Assignee: U.S. Philips Corporation, New York, N.Y.

[21] Appl. No.: 45,834

[22] Filed: Apr. 9, 1993

[30] Foreign Application Priority Data

Apr. 9, 1992 [GB] United Kingdom ............. 9207861.7

[51] Int. Cl.⁵ ...................... H04H 3/00; H04J 3/06; H04L 7/00
[52] U.S. Cl. .................. 370/100.1; 340/825.44; 368/47; 455/51.1
[58] Field of Search ...................... 370/17, 94.1, 94.2, 370/100.1, 103, 104.1, 105, 110.1; 340/825.2, 825.21, 825.26, 825.27, 825.44, 825.22, 870.04; 368/47; 455/38.2, 38.3, 67.1, 226.1, 38.1, 51.1, 51.2, 53.1, 54.1

[56] References Cited

U.S. PATENT DOCUMENTS

| | | | |
|---|---|---|---|
| 4,117,661 | 10/1978 | Bryant, Jr. | 340/825.26 X |
| 4,337,463 | 6/1982 | Vangen | 340/825.2 X |
| 4,845,491 | 7/1989 | Fascenda et al. | 340/825.44 |
| 5,089,814 | 2/1992 | DeLuca et al. | 340/825.44 X |
| 5,285,496 | 2/1994 | Frank et al. | 340/825.44 X |

FOREIGN PATENT DOCUMENTS

0110392 6/1984 European Pat. Off. .

OTHER PUBLICATIONS

Atsushi Murase, Japanese Patent Abstract 59-21633-4(A), Dec. 6, 1984.

Primary Examiner—Melvin Marcelo
Attorney, Agent, or Firm—Leroy Eason

[57] ABSTRACT

In a radio paging system each pager includes a timer having a clock to provide date and time stamping of received messages. To set the time of the pager clock, the system base station transmits time message signals at regular intervals but which are of variable accuracy due to delays in signal formatting and propagation. The invention provides a pager wherein a control unit sets the timer clock in accordance with the time indicated by a transmitted time message signal which is determined to be the most accurate, such signal being selected as a time reference signal. The most accurate signal is determined by comparing the differences in indicated times of transmission and reception of an already selected current time reference signal with those of a presently received time message signal. If the presently received time message signal is the more accurate, it is substituted as a new time reference signal in place of the current time reference signal.

10 Claims, 3 Drawing Sheets

COMMUNICATIONS SYSTEM AND RECEIVER FOR USE THEREIN WHICH INDICATES TIME BASED ON A SELECTED TIME MESSAGE SIGNAL FROM A CENTRAL STATION

BACKGROUND OF THE INVENTION

1. Field of the Invention

The present invention relates to a method of time measurement in a communications system, and to a communications system and a receiving apparatus for use in such system. It has particular application to cordless telephone and selective call., such as digital radiopaging, systems.

For convenience of description the invention will be described in the context of a digital radiopaging system.

2. Description of the Related Art

U.S. Pat. No. 4,845,491, issued Jul. 4, 1989 discloses a digital pager which is operable in accordance with the CCIR Radiopaging Code No. 1 standard otherwise known as POCSAG. In order for a user to be able to review chronologically messages stored in a memory, each message is stamped with the date and time of receipt. Date and time message signals are periodically transmitted by a paging network controller (PNC). However with respect to the time message signals, delays of up to 15 minutes may occur before they actually are transmitted. In order to correct for such errors in the pager clock, the next following time message signal as transmitted includes an indication of the error in the previously transmitted time message signal, that is delay in its transmission. Thus the pager clock can be updated on the basis of the time indicated in the previous time message signal ($t_{n-1}$), a correction $C_n$ representative of the difference between the time indicated in the previous time message signal and the time of its actual reception, and the time difference, as measured by a real time clock, between the times of receipt of the previous ($T_{n-1}$) and of the current ($T_n$) time message signals. The cited prior art patent gives the following formula for determining the updated time $T_{n(new)}$, viz $$T_{n(new)} = t_{(n-1)} + C_n + (T_n - T_{(n-1)}).$$

Whilst this known technique for determining real time is accurate, it nevertheless requires two message transmissions from the paging network controller and a pager receiver capable of comparing the time indicated in each time message against a reference time standard.

SUMMARY OF THE INVENTION

An object of the present invention is to simplify real time measurement by a receiver in such a selective call system.

According to a first aspect the invention provides receiving apparatus for use in a communications system in which a succession of time messages are transmitted by a central station, characterised in that the receiving apparatus comprises means for receiving and decoding successive time message signals, means for storing the times indicated in the time message signals, timing means for indicating the real time of receipt of each time message signal, and means for determining from the time message signals and the real times of their receipt which of such signals is to be treated as a current time reference signal to which the real time signals produced by the timing means are to be related.

According to a second aspect the invention provides a communications system comprising a central station having means for transmitting a succession of time message signals, each time message signal containing an indication of time, receiving means for receiving the time message signals, the receiving means having a real time clock and means for determining from the time message signals and the real times of their receipt which of such signals is to be treated as a current time reference signal to which the time indicated by the real time clock is to be related.

According to a third aspect the invention provides a method of time measurement in a communications system, such method comprising transmitting a succession of time message signals from a central station, each time message signal containing an indication of time, receiving the time message signals in a receiving apparatus having a real time clock, and determining from the time message signals and the real times of their receipt which of the time message signals is to be treated as a current time reference signal to which the time indicated by the real time clock is to be related.

Compared to the system disclosed in the cited Prior Art Patent, the present invention simplifies the measurement of time by deriving a time reference solely in the receiving apparatus, there being no necessity for the central station having to transmit time correction signals.

The means for determining which of the time message signals is to be used for deriving the current time reference signal may comprise means for determining the difference between the times indicated in the current received time reference signal and the most recently received time message signal, means for determining the difference between the real times of receipt of the current time reference signal and the most recently received time message signal, and means for comparing the indicated time difference with the real time difference and, depending on the result of such comparison, either confirming current time reference signal or substituting the most recently received time message signal as a new time reference signal for setting the real time clock. By determining which of the time message signals is the more accurate, and then using it as a reference signal, the time indicated by the time clock is closer to the true time.

If desired, whenever the real time difference exceeds a predetermined value, the most recently received time message signal can be treated as a new time reference signal. This enables receiving apparatus which is receiving time message signals to automatically update the indicated time of the time clock when changing time zones, for example on arrival at an airport.

The transmitted time message signal may include a correction relating to the minimum delay incurred between the generation of a time indication signal at the central station and the transmission of the corresponding time message signal. By including such a correction in the time message signal as transmitted, the variable time delay due to signal propagation between the central station and the receiving apparatus is relatively small, thereby ensuring that the current time reference signal is as accurate as possible.

In an embodiment of the present invention the central station transmits digital paging signals in accordance with a time division protocol comprising a succession of batches, each batch comprising a plurality of frames. The time message signals are transmitted periodically, a time message signal in a batch being preceded by an indicator signal including function bits denoting that codewords in the same and at least the next following frame(s) comprise a time message signal. The use of an indicator signal contributes to the battery power conservation in the receiving apparatus, because it can switch off its receiver on determining that the correct function bits are not present.

The symbols in the time message signals may be encoded as hexadecimal characters, which requires fewer bits than alternative codes such as ASCII 7 bit coding. An advantage of using a numeric only code however, rather than an alphanumeric code is that fewer codewords are required to send the time message signals and so do not significantly reduce the overall system message capacity.

BRIEF DESCRIPTION OF THE DRAWINGS

The present invention will now be described, by way of example, with reference to the accompanying drawings, wherein.

In the drawings the same reference numerals have been used to identify corresponding elements.

DESCRIPTION OF THE PREFERRED EMBODIMENTS

Figure 1:
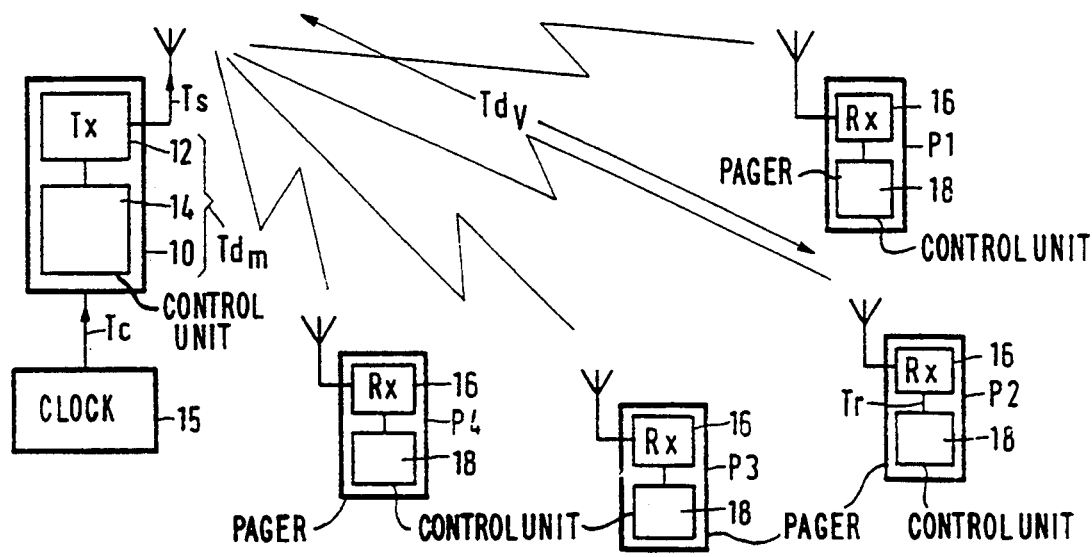
FIG. 1 is a block schematic diagram of a selective call system.

The selective call system shown in FIG. 1 comprises a paging network controller (PNC) 10 which is equipped with a transmitter 12 and a control unit 14 for formatting the signals to be transmitted, which signals may comprise pager identity codes (RICs) and/or message data such as date and time. A clock or other time reference source 15 is connected to or forms a part of the PNC 10.

A plurality of paging receivers (or pagers) P1 to P4 are provided. The pagers are able to roam in and out of the coverage area of the transmitter 12. Each pager P1 to P4 includes a radio receiver 16 which is tuned to the frequency of the transmitter 12, and a control unit 18. The latter controls the energisation of the radio receiver 16, the date and time stamping of received alert and/or message signals, and the energisation of an alerting device, for example an acoustic, visual and/or tactile transducer, in the event the control unit identifies the pager's RIC in a transmitted message.

Figure 2:
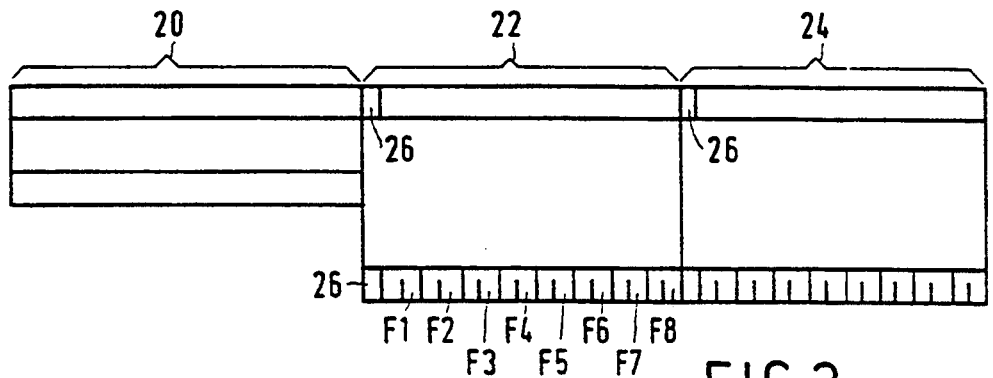
FIG. 2 is a diagram of the POCSAG signal format.

The signal format is CCIR Radiopaging Code No. 1 or POCSAG, and for the sake of completeness it will be described briefly with reference to FIG. 2. However for fuller information reference may be made to "The book of the CCIR Radiopaging Code No. 1" available from: Secretary RCSG, British Telecom, Radiopaging, 23 Howland Street, London W1P 6HQ. The transmissions from the PNC 10 comprises a series of bursts, each burst comprising a preamble 20 of 576 bits which serves to enable the pagers P1 to P4 achieve bit synchronisation, followed by concatenated batches of codewords formed by Radio Identity Codes (RICs) and data messages. Each batch 22,24 is arranged identically and comprises seventeen 32-bit codewords. The first codeword is a synchronisation codeword 26 which is used by a pager to achieve/maintain word synchronisation. The remaining sixteen codewords are paired and each of the eight pairs is termed a frame, F1 to F8. Each pager is assigned to a particular frame, which means that if necessary its RIG, or more precisely any one of its RICs will be transmitted in that frame, say frame F4, and no other. Thus as part of the inherent battery power conservation feature of POCSAG, the pager must energise its radio receiver 16 firstly to be able to receive the synchronisation codeword 26 and secondly for the duration of its frame, in this example F4, but for the duration of the other frames, that is F1 to F3 and F5 to F8, the receiving section 16 can be de-energised.

Data messages comprise an address codeword plus one or more concatenated message codewords.

Data and time messages, may be sent at regular intervals, for example once in every N batches, where N has a value of two or more, for example N=8, or once in every burst or less frequently, in order that battery power conservation may be practised in a predetermined manner. For the purposes of illustration the following description will assume that N=8 batches.

Figure 3:
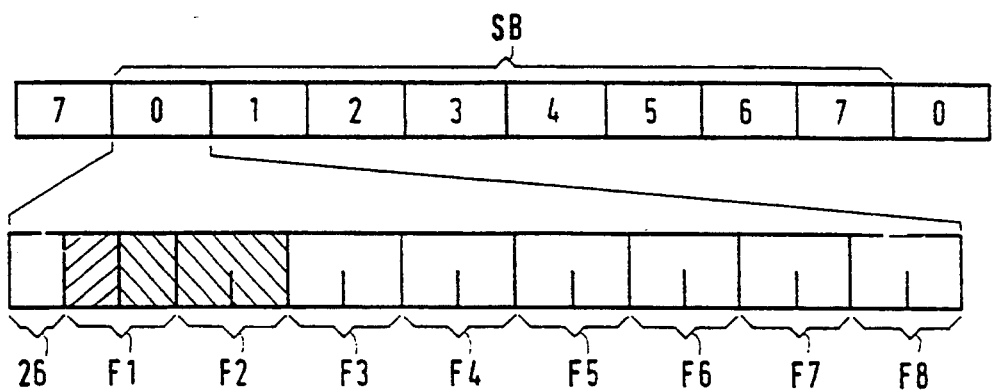
FIG. 3 is a diagram illustrating the sending of data in batches and inclusion of time message signals in one of every N batches, where N is an integer greater than 1, for example 8.

Referring to FIG. 3, every N, where N=8, batches form superbatch SB and once in every superbatch date and time information in the form year, month, day, hour, minute, second and thousands of a second, such as 92/02/20 12 hours, 10 minutes, 21 seconds and 357/1000th of a second, is transmitted as 4 bit hexadecimal characters by the PNC 10 in frames F1 and F2 of batch 0. More particularly the first codeword in the frame F1 includes function bits indicative of whether or not the following 3 codewords contain date and time information. A paging receiver or pager adapted to receive such a message signal is programmed to energise its radio receiver 16 to not only receive the synchronisation word (or sync. word) but also to remain energised for frame F1 of batch 0 in order to be able to detect whether the first codeword contains function bits signifying that date and time information is to :follow. In response to detecting such a codeword, the pager remains energised for the remainder of the frame F1 and for the frame F2. Thereafter the pager is energised in the normal way to receive the synchronisation codeword 26 in each batch and to be able to receive its RIC in its assigned frame.

Figure 4:
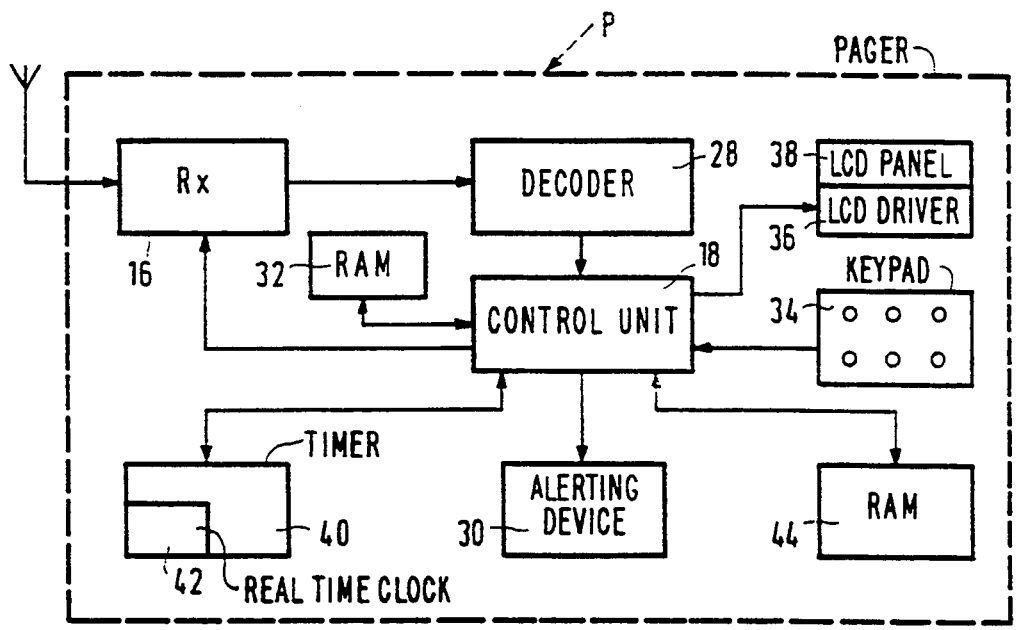
FIG. 4 is a block schematic diagram of a selective call receiver.

Referring to FIG. 4, the pager P comprises a housing, shown in broken lines, which contains a radio receiver 16 and a control unit 18 with associated circuits and devices. The radio receiver 16 can be of any suitable design, for example one based on Philips low power digital paging receiver IC type UAA 2033T or type UAA 2050T, and the control unit 18 may be based on the Philips DCA 5000T decoder. A decoder 28 is connected between an output of the receiver 16 and an input to the control unit 18. The decoder 28 accepts any signal which is received during the period(s) when the receiver is energised, checks and corrects any possible errors within the capacity of the POCSAG code and presents the signals, codeword by codeword, to the control unit 18 which as a first action checks whether the address codeword corresponds to one of the radiopager's RICs stored in the control unit's non-volatile memory. If there is correspondence then in the case of an alert only paging signal, the control unit 18 causes an audio, visual and/or tactile alerting device 30 to be energised. In a case of the received signal comprising concatenated message codewords, the control unit 18 stores these together with a date and time stamp in a RAM 32. In response to a command produced by the subscriber actuating a button on a keypad 34, the control unit 18 causes the contents of the RAM 32 to be read out and supplied to the driver 36 of an LCD panel 38.

In the event of there not being correspondence between the received address codeword(s) and the radiopager's RIC, the control unit 18 takes no action.

A timing stage 40 is connected to the control unit 18 and provides timing signals thereto so that it can carry out various operations including battery power conservation which is inherent in the POCSAG code.

The timing stage 40 also includes a real time clock 42, upon receipt of successive date and time messages, the control unit 18 stores the year, month and day indicated in such messages in a RAM 44 together with time, after the time indicated in the time message signal has been adjusted to take into account the delays incurred in encoding and formatting the time message signal and propagation delays in transmitting signals to pagers P1 to P4 which may be roaming throughout the coverage area of the base station transmitter 12 (FIG. 1).

Referring to FIG. 1, a time signal Tc is generated by the clock 15 and is supplied to the control unit 14 which adapts the signal to a message format and stores it temporarily in readiness for transmission by the transmitter 12 at the required moment, for example in frames F1 and F2 of batch 0 of the superbatch SB. Tile date and time signal is received by those pagers adapted to receive these signals. However, the actual time of receipt at a given pager will depend on its distance from the antenna of the PNC 10. Consequently there will be a variable delay between the origination of the time signal Tc and its actual time of receipt by a roaming pager.

The delay comprises two main elements, firstly the time delay within the PNC 10 itself, and secondly the propagation time to the respective pager. In accordance with the present invention a pager chooses one of the received time message signals as a reference and sets its internal clock to count time from that reference. However, as a time message signal to be used as a reference may not be the optimum signal, the pager compares each newly received time message signal with the current reference and decides if the newly received time message signal is more accurate.

The processing of the time clock signal Tc in the PNC 10 is assumed to require a minimum time delay $Td_m$. Accordingly the accuracy of the transmission time Ts indicated in a time message signal is improved if $Td_m$ is added to Tc, thus $$Ts = Tc + Td_m \quad (1)$$

The propagation time to a pager plus the excess processing time over $Td_m$ in PNC 10 introduces a variable delay $Td_v$. In consequence the real time of receipt Tr at the pager of the transmitted time message signal is:

$$Tr = Tc + Td_m + Td_v \quad (2)$$

Substituting equation (1) into equation (2)

$$Tr = Ts + Td_v \quad (3)$$

If two signals $Ts_1$ and $Ts_2$ are in a sequence of time message signals, then from equation (3)

$$Tr_1 = Ts_1 + Td_{v1} \quad (4)$$

and $$Tr_2 = Ts_2 + Td_{v2} \quad (5)$$

Subtracting equation (4) from equation (5), we get $$(Tr_2 - Tr_1) = (Ts_2 - Ts_1) + (Td_{v2} - Td_{v1}) \quad (6)$$

Examining equation (6), $Ts_1$ and $Ts_2$ are known, $Tr_1$ and $Tr_2$ are measured at the pager, and $Td_{v1}$ and $Td_{v2}$ are unknown but can be calculated from equation (3), (4) or (5). However the smaller the value of $Td_v$, the closer Tr is to Ts and therefore the more accurate the value of Tr.

Rewriting equation (6) we get $$(Tr_2 - Tr_1) - (Ts_2 - Ts_1) = (Td_{v2} - Td_{v1}) \quad (7)$$

If $(Td_{v2} - Td_{v1})$ is positive, then $Td_{v1}$ is smaller than $Td_{v2}$ and therefore $Tr_1$ is closer to its time message signal $Ts_1$ than $Tr_2$ is to $Ts_2$. Conversely if it is negative then $Td_{v2}$ is smaller than $Td_{v1}$ and the opposite applies.

Accordingly at switch-on of the pager, the indicated time of transmission and reception of two successive time messages are noted and the computation shown in equation (7) is carried out by the control unit 18 (FIG. 4). The right hand side of the equation is examined as to the sign of the difference, and if it is positive then time message signal $Ts_1$ is treated as the current reference signal, $Ts_{ref}$, and the real time clock 42 (FIG. 4) is set to count time from $Tr_1$. The opposite situation applies if the sign is negative, and the real time clock 42 is set to count time from $Tr_2$.

Thereafter, on receipt at time $Tr_n$ of a subsequent time message signal $Ts_n$, equation (7) is solved for $$(Tr_n - Tr_{ref}) - (Ts_n - Ts_{ref}) = (Td_{vn} - Td_{vref}) \quad (8)$$

Figure 5:
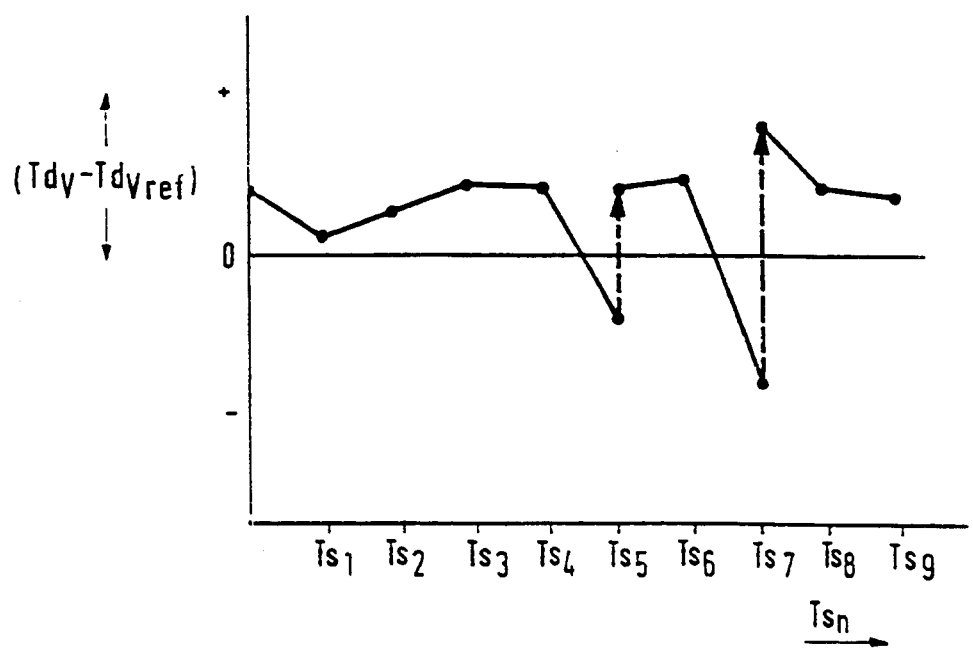
FIG. 5 is a graph illustrating the determination of the best time message signal to use as a reference.

As long as the sign of the right hand side of equation (8) remains positive, the same reference is maintained. However, if the sign is negative, then the newly received time message signal $Ts_n$ is treated as the reference and the real time clock 42 is set to treat $Ts_n$ as zero and to start its count from there. This is illustrated in FIG. 5, in which time message signals $Ts_5$ and $Ts_7$ are assumed to become new reference signals.

In the event of the right hand side of equation (7) being zero, then the accuracy of $Tr_n$ and $Tr_{ref}$ is the same and the pager can either change its reference signal or keep its existing reference signal.

If the size of the difference in equation (7) is measured as well as determining the sign of the difference, then the clock in the pager can be updated automatically for a change in time zones. This facility can be useful for automatically altering the time indicated on a watch or another device having a pager, such as a pocket sized personal computer having means for displaying time.

Thus if a traveller disembarking at say an airport has a pager which is able to receive paging signals containing date and time message signals, then if when a newly received timing message $Ts_n$ signal is compared with the current reference signal, $Ts_{ref}$, the difference exceeds the time equivalent of say 15 minutes, the control unit 18 will conclude that $Ts_{ref}$ is grossly incorrect and that the newly received signal is more correct. It will therefore treat the new timing message $Ts_n$ as a new reference signal, and simultaneously stores it in the RAM 44 (FIG. 4) and update the indicated time to that contained in the new time message signal. Thereafter the pager behaves as described previously.

Figure 6:
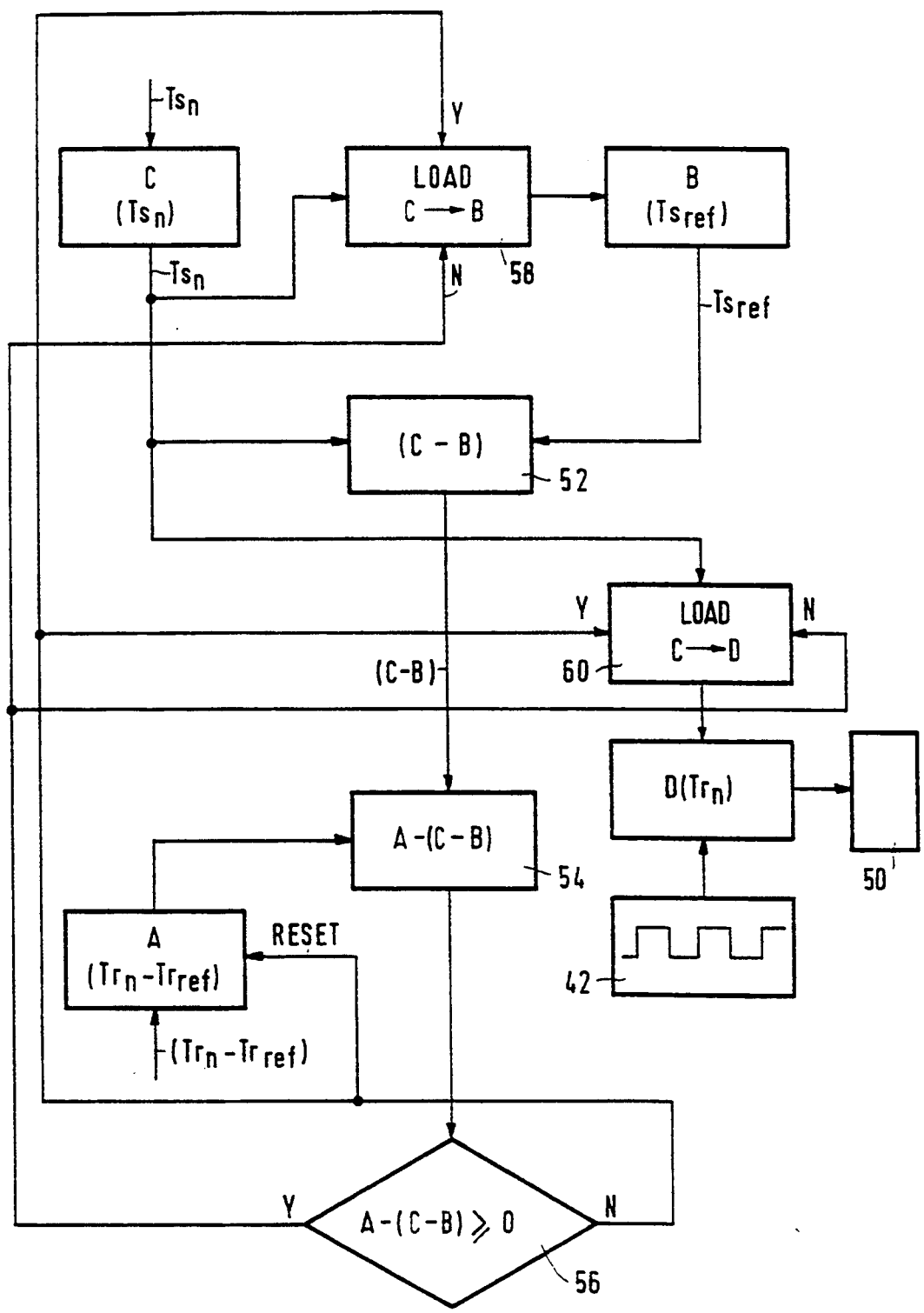
FIG. 6 is a flow chart illustrating time measurement in accordance with the present invention.

The operation of selecting or verifying that $Ts_{ref}$ is the best is described by equation (8). One method for implementing equation (8) is shown in FIG. 6. The difference $(Tr_n - Tr_{ref})$ is stored in a counter or store A. The time message signal $Ts_{ref}$ is stored in a store B and the latest received time message signal $Ts_n$ is stored in a store C. Finally $Tr_n$, which is the current time displayed, is stored in store D which has an input coupled to the clock 42 and an output coupled to a display device 50.

From the items stored and the operations carried out in blocks 52,54, if the output of decision stage 56 is "Yes" (Y), that is $A - (C - B) \geq 0$, then the operations in blocks 58 and 60 are inhibited by the respective N inputs. As a result the time reference $Ts_{ref}$ is retained and stores A,C,D are incremented normally.

Alternatively, if the output of the decision stage 56 is "No" (N), then as a result of a new $Ts_{ref}$ being selected store A is reset to zero and blocks 58,60 are enabled by the signal on the Y inputs so that the current value of $Ts_n$ is loaded into store B to become the new $Ts_{ref}$ and into store D to indicate the current time on the display device 50.

In a variant of the method in accordance with the present invention, the clock time Tc is transmitted as the time message signal without being altered by the addition of $Td_m$, as a result $Td_v$ is greater due to having to take $Td_m$ into account. Hence the value of $Ts_{ref}$ may be less accurate than the example described with reference to FIG. 1. However, for certain applications the reduced accuracy in $Ts_{ref}$ can be tolerated.

If desired, the correction value $Td_m$ may be added to tile indicated time on the pager when it has not been taken into account at the PNC 10.

From reading the present disclosure, other modifications will be apparent to persons skilled in the art. Such modifications may involve other features which are already known in the design, manufacture and use of receiving systems for measuring time and component parts thereof, and which may be used instead of or in addition to features already described herein without departing from the scope of the ensuing claims. It should also be understood that the scope of the disclosure of the present application may include novel features or combinations of features either explicitly or implicitly which may or may not relate to the same invention as presently claimed in any claim and may or may not mitegate any or all of tile same technical problems as does the present invention. The applicants hereby give notice that claims may be formulated to such features and/or combinations of such features in further applications.

I claim:

1. A receiving apparatus for use in a communication system wherein a succession of time message signals are transmitted to the receiving apparatus by a central station, each time message signal indicating its time of transmission with an accuracy which varies with different time message signals; said receiving apparatus comprising:

a receiving section for receiving the time message signals and decoding means coupled thereto for decoding said signals so as to derive the transmission times indicated thereby;

storage means for storing the indicated transmission times of the received time message signals;

timing means for producing timing signals indicative of actual time in relation to a reference time setting of said timing means, said reference time setting being the indicated transmission time of a received time message signal which has been selected and supplied to said timing means as a current time reference signal; and control means for selecting and supplying time reference signals to said timing means, said control means being adapted to (i) determine from said timing signals an indicated time of reception of a presently received time message signal, as based on a current reference time setting of said timing means; and (ii) compare the indicated reception and transmission times of the presently received time message signal with the indicated reception and transmission times of the current time reference signal, from said comparison determine whether the presently received time message signal is more accurate than the current time reference signal, and in that event select and supply the presently received time message signal to said timing means as a new time reference signal replacing the current time reference signal.

2. A receiving apparatus as claimed in claim 1, wherein said control means comprises:

means for deriving a first time difference corresponding to the difference between the indicated times of transmission of said current time reference signal and said presently received time message signal;

means for deriving a second time difference corresponding to the difference between the indicated times of reception of said current time reference signal and said presently received time message signal; and means for comparing the first and second time differences and based on the result of said comparison determining whether to supply said presently received time message signal to said timing means as a new time reference signal replacing said current time reference signal.

3. A communication system comprising:

a central station and at least one receiver, said central station being adapted to transmit a succession of time message signals each of which indicates its time of transmission with an accuracy which differs for different time message signals, said receiver comprising:

a receiving section for receiving the time message signals and decoding means coupled thereto for decoding to derive the indicated transmission times of the received signals;

storage means for storing the indicated transmission times of the received message signals;

timing means for producing timing signals indicative of actual time in relation to a reference time setting of said timing means, said reference time setting being the indicated transmission time of a received time message signal which has been selected and supplied to said timing means as a current time reference signal; and control means for selecting and supplying time reference signals to said timing means, said control means being adapted to
(i) determine from said timing signals an indicated time of reception of a presently received time message signal, as based on a current reference time setting of said timing means; and
(ii) compare the indicated reception and transmission times of the presently received time message signal with the indicated reception and transmission times of the current time reference signal, from said comparison determine whether the presently received time message signal is more accurate than the current time reference signal, and in that event select and supply the presently received time message signal to said timing means as a new time reference signal replacing the current time reference signal.

4. A communication system as claimed in claim 3, wherein said control means comprises:
means for deriving a first time difference corresponding to the difference between the indicated times of transmission of said current time reference signal and said presently received time message signal;
means for deriving a second time difference corresponding to the difference between the indicated times of reception of said current time reference signal and said presently received time message signal; and
means for comparing the first and second time differences and based on the result of said comparison determining whether to supply said presently received time message signal to said timing means as a new time reference signal replacing said current time reference signal.

5. A communication system as claimed in claim 4, wherein said control means further comprises means coupled to said means for determining said second time difference and which, when said second time difference exceeds a predetermined value, causes said control means to supply the presently received time message signal to said timing means as a new time reference signal replacing the current time reference signal.

6. A communication system as claimed in claim 3, wherein the central station comprises means for generating said time message signals and means for updating the indicated transmission times thereof to take into account a minimum delay incurred in formatting each of said signals in accordance with their actual times of transmission.

7. A communication system as claimed in claim 3, wherein the central station is further adapted to transmit digital paging signals in accordance with a time division protocol comprising a succession of data batches, each batch comprising a plurality of frames; said time message signals being transmitted by the central station periodically in the form of codewords included in a plurality of frames of certain of said batches; and the central station comprises means for inserting into a batch having frames which include said codewords an indicator signal including function bits signifying the presence of said codewords in said batch.

8. A method of operation of receiving apparatus in a communication system wherein a central station transmits to the receiving apparatus a succession of time message signals which indicate their times of transmission with an accuracy which varies for different time message signals; said method comprising the steps of:
(a) receiving a present time message signal and decoding to derive the transmission time indicated thereby;
(b) producing timing signals indicative of actual time in relation to a reference time setting of said timing signals, said reference time setting being the indicated transmission time of a previously received time message signal which has been selected as a current time reference signal;
(c) determining from said timing signals a time of reception indicated thereby for the presently received time message signal;
(d) comparing the indicated reception and transmission times of the presently received time message signal and the current time reference signal, and based on said comparison determining which of said signals is more accurate; and
(e) if the presently received time message signal is determined in step (d) to be more accurate, substituting the transmission time indicated thereby as a new time reference setting for the timing signals produced in step (b).

9. A method as claimed in claim 8, wherein determination of whether a present received time message signal is more accurate than the current time reference signal is performed by the steps of:
(a) deriving a first time difference corresponding to the difference between the indicated times of transmission of the present time message signal and the current time reference signal;
(b) deriving a second time difference corresponding to the difference between the indicated times of reception of the present time message signal and the current time reference signal; and
(c) determining whether said first time difference exceeds said second time difference.

10. A method as claimed in claim 8, further comprising:
transmission by the central station of digital paging signals in accordance with a time division protocol comprising successive data batches, each batch comprising a plurality of data frames;
transmission by the central station of said time message signals periodically, each in the form of a plurality of codewords included in a plurality of frames of certain of said batches; and
including in a batch which includes a time message signal an indicator signal which precedes said time message signal, said indicator signal including function bits denoting that codewords of a time message signal are present in a plurality of frames of said batch.

* * * * *